US008392930B2

(12) United States Patent
Goldin

(10) Patent No.: US 8,392,930 B2
(45) Date of Patent: Mar. 5, 2013

(54) RESOURCE CONTENTION LOG NAVIGATION WITH THREAD VIEW AND RESOURCE VIEW PIVOTING VIA USER SELECTIONS

(75) Inventor: Maxim Goldin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 477 days.

(21) Appl. No.: 12/721,662

(22) Filed: Mar. 11, 2010

(65) Prior Publication Data
US 2011/0225592 A1    Sep. 15, 2011

(51) Int. Cl.
*G06F 9/46* (2006.01)
*G06F 3/00* (2006.01)
(52) U.S. Cl. ......... 718/104; 718/100; 718/102; 715/738
(58) Field of Classification Search ........................ None
See application file for complete search history.

(56) References Cited

U.S. PATENT DOCUMENTS

| | | | |
|---|---|---|---|
| 6,721,775 B1 | 4/2004 | Fagen et al. | |
| 6,826,752 B1 | 11/2004 | Thornley et al. | |
| 7,502,968 B2 * | 3/2009 | Betancourt et al. | 714/38.11 |
| 7,587,584 B2 | 9/2009 | Enright et al. | |
| 8,195,896 B2 * | 6/2012 | Barsness et al. | 711/150 |
| 8,225,315 B1 * | 7/2012 | Cheng et al. | 718/1 |
| 2005/0081206 A1 * | 4/2005 | Armstrong et al. | 718/100 |
| 2005/0289546 A1 | 12/2005 | Shpeisman et al. | |
| 2006/0010444 A1 * | 1/2006 | Seidman et al. | 718/100 |
| 2006/0143610 A1 * | 6/2006 | Toader | 718/100 |
| 2006/0206901 A1 * | 9/2006 | Chan | 718/107 |
| 2007/0067777 A1 * | 3/2007 | Branda et al. | 718/107 |
| 2007/0220513 A1 | 9/2007 | Hwang | |
| 2008/0155548 A1 * | 6/2008 | Dettinger et al. | 718/102 |
| 2009/0222825 A1 | 9/2009 | Upadhyaya et al. | |
| 2009/0271789 A1 * | 10/2009 | Babich | 718/100 |

OTHER PUBLICATIONS

Proceedings of the Workshop on Binary Instrumentation and Applications, In cooperation with the The 42nd Annual IEEE/ACM International Symposium on Microarchitecture (MICRO-42), including Serebryany, et al., "ThreadSanitizer—data race detection in practice" and other references, Dec. 12, 2009, Retrieved at <<pintool.org/wbia09.pdf#page=62 >>, pp. 71.
Narayanasamy, et al., "Automatically Classifying Benign and Harmful Data Races Using Replay Analysis", ACM SIGPLAN Notices , 2007, vol. 42 , Issue 6, Retrieved at <<cseweb.ucsd.edu/users/calder/papers/PLDI-07-DataRace.pdf>>, pp. 11.

(Continued)

*Primary Examiner* — Meng An
*Assistant Examiner* — Tammy Lee
(74) *Attorney, Agent, or Firm* — Ogilvie Law Firm

(57) ABSTRACT

A contention log contains data for contentions that occur during execution of a multi-threaded application, such as a timestamp of the contention, contention length, contending thread identity, contending thread call stack, and contended-for resource identity. After execution of the application ends, contention analysis data generated from the contention log shows developers information such as total number of contentions for particular resource(s), total number of contentions encountered by thread(s), a list of resources that were most contended for, a list of threads that were most contending, a plot of the number of contentions per time interval during execution of the application, and so on. A developer may pivot between details about threads and details about resources to explore relationships between thread(s) and resource(s) involved in contention(s). Other information may also be displayed, such as call stacks, program source code, and process thread ownership, for example.

20 Claims, 7 Drawing Sheets

OTHER PUBLICATIONS

Shafi, "Hazim Shafi's Blog : Performance Pattern 1: Identifying Lock Contention", Jun. 19, 2009, Retrieved at <<blogs.msdn.com/.../performance-pattern-1-identifying-lock-contention.aspx>>, pp. 6.

Robbins, "John Robbins' Blog : VS 2010 Beta 2 Concurrency Resource Profiling in Depth First Look", Oct. 19, 2009, Retrieved at <<wintellect.com/CS/blogs/jrobbins/archive/2009/10/19/vs-2010-beta-2-concurrency-resource-profiling-in-depth-first-look.aspx>>, pp. 11.

"Thread Analysis—Eclipsepedia", Oct. 10, 2008, Retrieved at <<wiki.eclipse.org/Thread_Analysis>>, pp. 4.

"Getting Started with the Intel® Parallel Amplifier", 2009, Retrieved at <<software.intel.com/sites/products/documentation/studio/amplifier/en-us/2009/start/getting_started_amplifier.pdf>>, pp. 18.

"Intel® Parallel Studio Home—Intel® Software Network", no later than Mar. 11, 2010, Retrieved at <<software.intel.com/en-us/intel-parallel-studio-home/>>, pp. 2.

"Profiling Tools Report Views" and linked pages, no later than Mar. 11, 2010, Retrieved at <<msdn.microsoft.com/en-us/library/ . . . >>, pp. 6.

* cited by examiner

RESOURCE CONTENTION LOG NAVIGATION WITH THREAD VIEW AND RESOURCE VIEW PIVOTING VIA USER SELECTIONS

BACKGROUND

Some computer programs are organized into multiple threads, which can be run simultaneously on different processors and/or can be multiplexed on a single processor. During execution, a thread may try to acquire a resource, such as an object in memory or a particular piece of hardware, which one or more other threads are also trying to acquire or have already acquired. Resources may be shared between threads due to memory, cost, and/or other constraints, for example. Shared resources may also be used to synchronize threads with one another and/or with system operations such as "garbage collection" which reclaims unused memory, for example. When more threads attempt to access a resource than the resource is designed to allow, the threads are said to "contend" with one another for the resource.

SUMMARY

The interaction of resources and threads during execution of multi-threaded programs can be extremely complex, making detection and analysis of problems difficult. Large amounts of information to consider, differences in program behavior between one execution and another, changes in program behavior that may be due to instrumentation or other diagnostic efforts, and other factors can complicate efforts to understand interactions between threads, and to understand the interaction of threads with resources. Accordingly, developers may wish to utilize a variety of approaches.

Some embodiments described herein facilitate contention analysis, namely, the analysis of contention between threads for one or more limited resources. A multi-threaded application of interest is executed. During the execution, instrumentation and/or other mechanisms are used to create a contention log for the application. The contention log records data for some or all of the contentions that occur during the execution. Data logged for a given contention includes, for example, a timestamp of the contention, a length (e.g., cycles, elapsed time) of the contention, at least one contending thread identity, at least one contending thread call stack, and at least one contended-for resource identity. After execution of the application ends, statistics can be generated from the contention log, such as a total number of resource point-of-view contentions (number of contentions for a particular resource, or for all resources) during execution of the application, a total number of thread point-of-view contentions (contentions encountered by the thread) during execution of the application, a list of resources that were most contended for, a list of threads that were most contending, a plot of the number of contentions per time interval during execution of the application, and so on.

Some embodiments allow a developer to pivot between details about threads and details about resources. For instance, a developer may select a particular resource, and then display resource details which include a list of threads that contended for that particular resource during execution of the application. The developer can then select one of the threads that contended for the particular resource, and in turn display thread details which include a list of resources the selected thread contended for during execution. Pivoting may also occur from a thread to a resource to a thread, and so on. Pivoting facilitates contention analysis by allowing developers to conveniently explore relationships between thread(s) and resource(s) involved in contention(s). Other information may also be displayed, such as call stacks, program source code, and process thread ownership, for example.

The examples given are merely illustrative. This Summary is not intended to identify key features or essential features of the claimed subject matter, nor is it intended to be used to limit the scope of the claimed subject matter. Rather, this Summary is provided to introduce—in a simplified form— some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
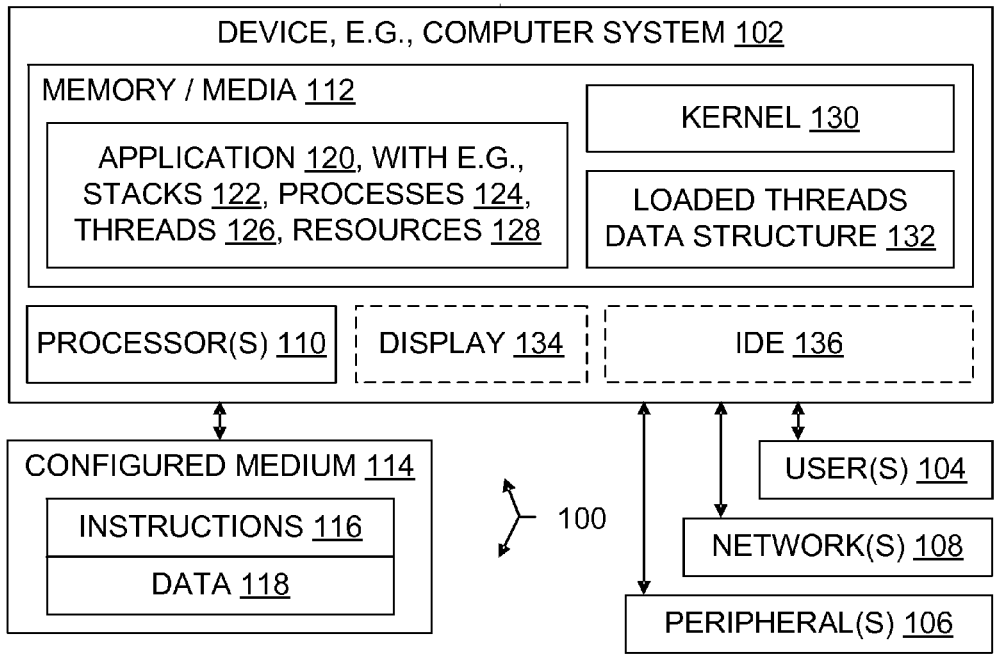
FIG. 1 is a block diagram illustrating a computer system having at least one processor, at least one memory, at least one multi-threaded application, and other items in an operating environment which may be present on multiple network nodes, and also illustrating configured storage medium embodiments.

Increased usage of multiple core machines encourages developers to create multithreaded applications, in order to gain from the hardware power and run several application code segments in parallel. In some cases, however, it is difficult to determine how much thread synchronization is enough but not too much. Overuse of synchronization can cause redundant contentions, so threads are blocked waiting on synchronization objects/locks instead of progressing.

A lock contention happens when several threads are trying to take an ownership in (acquire) the same synchronization object in order to gain an access to protected code and/or data. Thus, in such a contention there is generally an owner thread (which acquired the object successfully), and one or more other threads that failed to acquire the object and are blocked until the object is released. To improve multithreaded application performance, it is helpful to analyze contentions that happen during the application lifetime (that is, during an execution of the application), and reduce/eliminate some or all of them.

Some familiar techniques allow detection of threads blocked in a contention, including some techniques implemented, for example, in Microsoft® Visual Studio® 2010 software as a specific profiling mode (marks of Microsoft Corporation). Some operating system implementations may make it difficult or impractical to track down the owner thread of a synchronization object. Thus, if multiple contentions over specific object(s) become a performance bottleneck of a multi-threaded program execution, it may be helpful to analyze those contentions and decide whether successful object acquisitions can be eliminated, to prevent them from causing multiple unsuccessful acquisition attempts (contentions).

Some familiar techniques are designed for thread analysis within a currently running application, rather than an analysis after the application's execution has ended. While the application is running, however, less contention history is available to analyze, and greater performance constraints may be imposed on the analysis to prevent degradation of application performance.

Some embodiments described herein collect all lock contentions data for an execution run, and provide a resource-based visualization in which all contentions of multiple threads for a specified resource are presented. Some provide a thread-based visualization, in which all contentions of the thread on any of several resources are presented. Some embodiments store contentions data in a data structure which allows swift pivoting between resource-based views and thread-based views. Developers may use an iterative approach, pivoting between views to investigate blocked threads and detect a synchronization object (resource) thread owner. The context of the pivoting (which resource/thread to focus on) can be controlled by the user.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known in other contexts by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

"Multi-threaded application" means any software which may run two or more threads. In particular, although it may well happen that most of the software undergoing contention analysis as discussed herein is designed to run as a stand-alone application program at a level located between a human user and a kernel, embodiments are not limited to analysis of such software. Some embodiments may be applied to contention analysis of lower level software such as kernels, for example, or to software that does not necessarily stand alone, such as libraries.

Throughout this document, use of the optional plural "(s)" means that one or more of the indicated feature is present. For example, "thread(s)" means "one or more threads" or equivalently "at least one thread".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or other types of media which do not propagate a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, flash disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by pivoting, logging, analysis, visualization, binding, deployment, execution, modification, display, creation, loading, and/or other operations.

An application 120 including call stacks 122, process(es) 124, threads 126, and shared resource(s) 128, as well as a kernel 130, other software, and other items shown in the Figures may reside partially or entirely within one or more media 112, thereby configuring those media. In particular, a loaded threads data structure 132 indicates which thread(s) 126 are currently loaded for execution, e.g., currently, running or blocked, as opposed to threads which have not been given memory, a place in a processor queue, and other resources allocated to loaded threads. The details of the loaded threads data structure 132 may vary from kernel to kernel or otherwise from one system to another, but in general a system running multiple threads has some form of data structure 132 that keeps track of which threads are progressing, which are blocked, and/or other status information that can be used to determine whether a multi-threaded application has finished an execution run. An operating environment may also include a display and other hardware, such as buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use multiple threads capable of contending for resource(s).

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
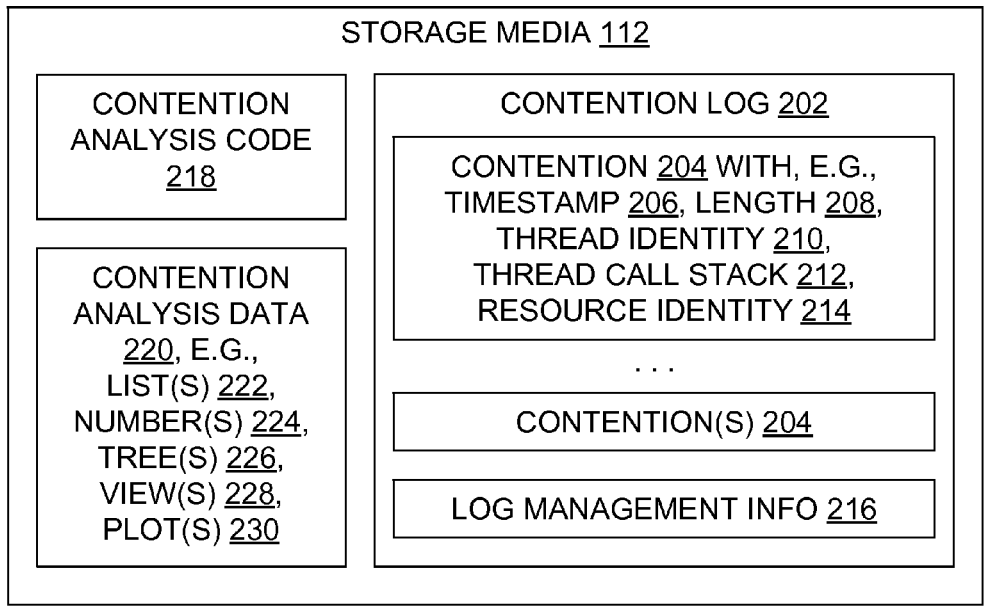
FIG. 2 is a diagram illustrating contention analysis support in an example architecture.

FIG. 2 illustrates an architecture which is suitable for use with some embodiments. A contention log 202 includes data structure entries containing data for contentions 204, namely events during execution of an application 120 in which two or more threads contended for a resource. For convenience, the log entries are also referred to herein as contentions 204; discussion context herein indicates whether an execution-time event, a log entry, or both are being referred to when a "contention" is discussed.

As illustrated, a log entry contention 204 may include data such as a timestamp 206, a length 208, a thread identity 210, a thread call stack 212, and a resource identity 214. A contention 204 in the execution-event sense is associated with such data values 206-214. For instance, the contention event occurs at a particular time, denoted by the timestamp 206. The contention event lasts for a period of time, denoted by the length 208. Length 208 may be implemented using a start time and a duration, or using a start time and an end time. Contention data may be organized in the log entries in various ways. For instance, an entry may list a single thread identity 210 and a single resource identity 214, indicating that the identified thread contended for the identified resource, or an entry may list multiple thread identities and/or multiple resource identities. Logs 202 are not necessarily limited to contention entries, but may also contain other data. For example, log management info 216 may be present, identifying the application 120 and particular versions of application, runtime, development tool, and other code used to create and run the execution to which the contention entries pertain.

Contention analysis code 218 extracts contentions 204 from the log 202, processes their data in various ways discussed herein, and produces contention analysis data 220 to assist contention analysis by developers. For example, contention analysis data may include lists 222 of threads and/or resources, contention event totals and other numbers 224, call trees 226, resource-based views 228, thread-based views 228, other views 228, and plots 230 such as a graph of contention event counts over time during application execution.

Some embodiments provide a computer system 102 including a logical processor 110 and a memory medium 112 in operable communication with the logical processor. A loaded threads data structure 132 resides in the memory and identifies all currently loaded threads 126 in the system. Thus, the loaded threads data structure can be used to distinguish between applications 120 whose execution has ended and those whose execution has not ended. In the present case, the loaded threads data structure 132 indicates that a particular application program has no currently loaded threads, namely, the application 120 whose contentions are to be analyzed. A contention log 202 residing in the memory has at least the following information for each of a plurality of logged contentions 204 (log entries) of a previous execution of the particular application program: a timestamp 206 of the contention, a contending thread identity 210, a contending thread call stack 212, and a contended-for resource identity 214. Contention analysis code 218 also configures the system 102. Upon execution of the contention analysis code 218, a display 134 in the system will be configured with contention analysis data 220 that corresponds to the contention log 202. In some embodiments, the same system 102 containing the log 202 and the analysis code 218 also includes the display 134.

In some cases, the display is configured by contention analysis data 220 which includes for each of a plurality of resources 128 a total number 224 of resource point-of-view contentions 204 for the resource, and also includes for each of a plurality of threads 126 a total number 224 of thread point-of-view contentions 204 encountered by the thread. Resource point-of-view contentions 204 (whether they be events and/or entries) are contentions viewed from a resource's perspective, that is, contentions in which the resource was sought by at least two contending threads. Thread point-of-view contentions 204 (events and/or entries) are contentions viewed from a thread's perspective, that is, contentions in which the thread contended for some resource.

In some cases, the display is configured by contention analysis data 220 which includes at least one of the following: a list 222 of threads which contended for a particular resource during execution of the particular application program; a list 222 of resources which a particular thread contended for during execution of the particular application program.

In some cases, the display is configured by contention analysis data 220 which includes contention call trees 226 organized according to contended-for resource. That is, the display shows stacks 122 for threads 126 that were blocked on a specific resource 128, for each of a plurality of resources. In some cases, the display is configured by contention analysis data 220 which includes a list 222 of software processes of the particular application program, showing for each such software process a list 222 of threads 126 belonging to the software process, and showing for each such thread a number 224 of contentions made by the thread during execution of the particular application program.

Figure 5:
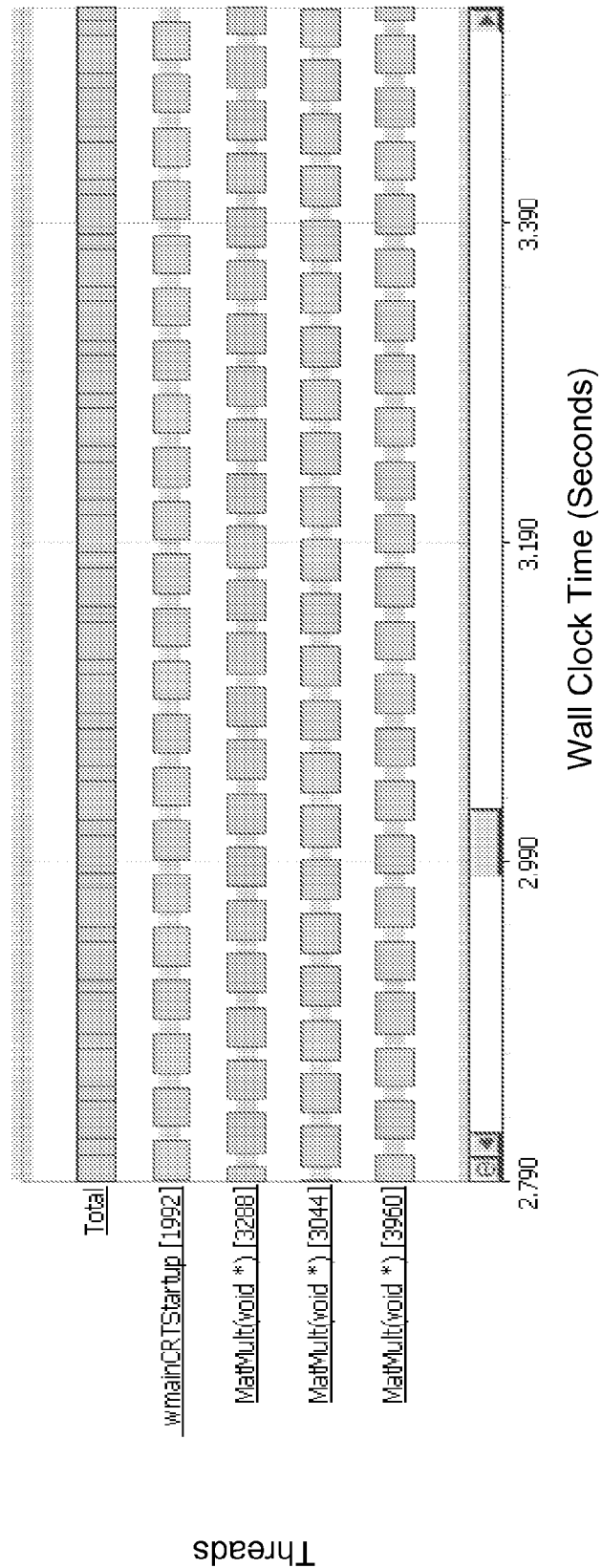
FIG. 5 is an annotated screen shot illustrating resource contention details for viewing in some embodiments.
Figure 6:
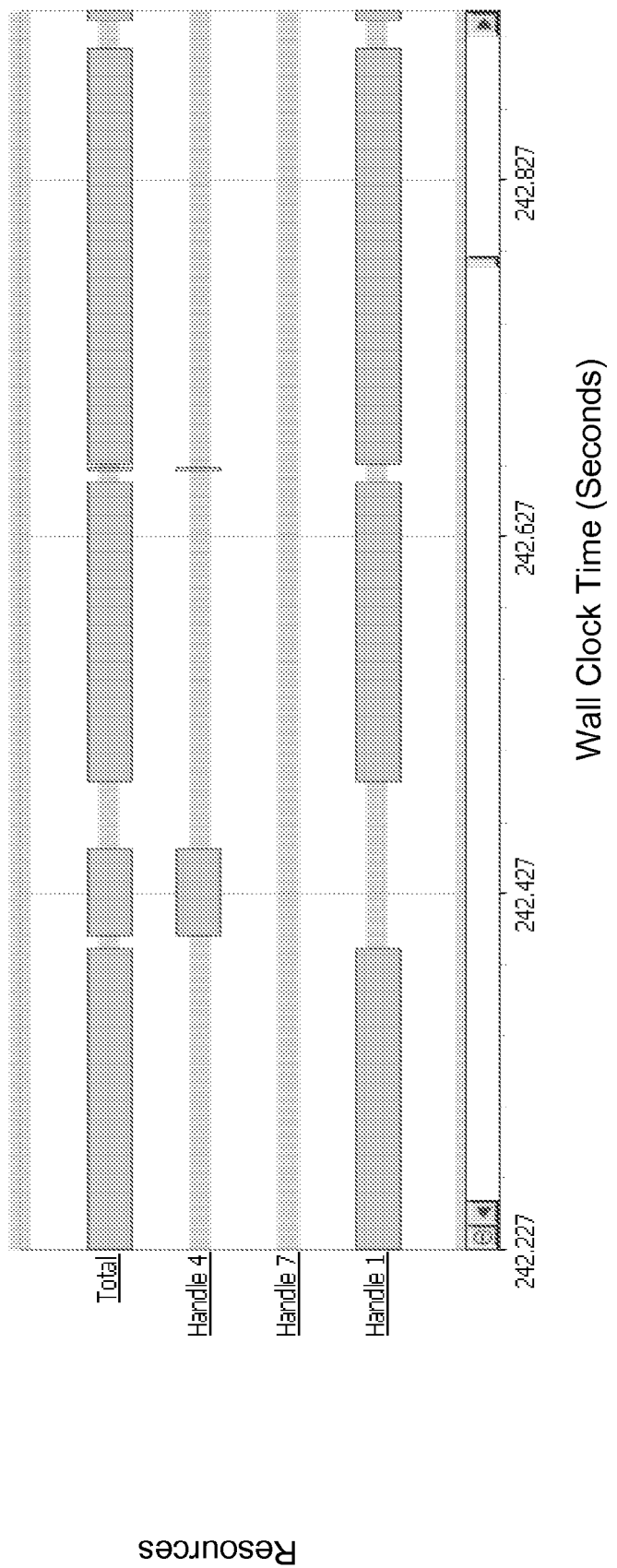
FIG. 6 is an annotated screen shot illustrating thread contention details for viewing in some embodiments.

Some embodiments provide a domain-specific usage of data collected for each contending thread, to help developers detect possible owners of a synchronization object (synchronization objects are examples of resources 128). To achieve this, each collected contention data structure is affiliated with specific attributes: the contention timestamp 206, the contention length 208, the contended thread identity 210, the contended thread call stack 212, 122, and the synchronization object (resource) identity 214. Using this information, it is possible to plot resource-(e.g., synchronization object) based and/or thread-based view(s) of all contentions, or at least all logged contentions 204. For example, for a specific resource it is possible to show all threads 126 that were blocked while trying to enter the critical section, as illustrated in FIG. 5. Similarly, for a specific thread it is possible to present all resources that the thread was contending on, as illustrated in FIG. 6.

Figure 7:
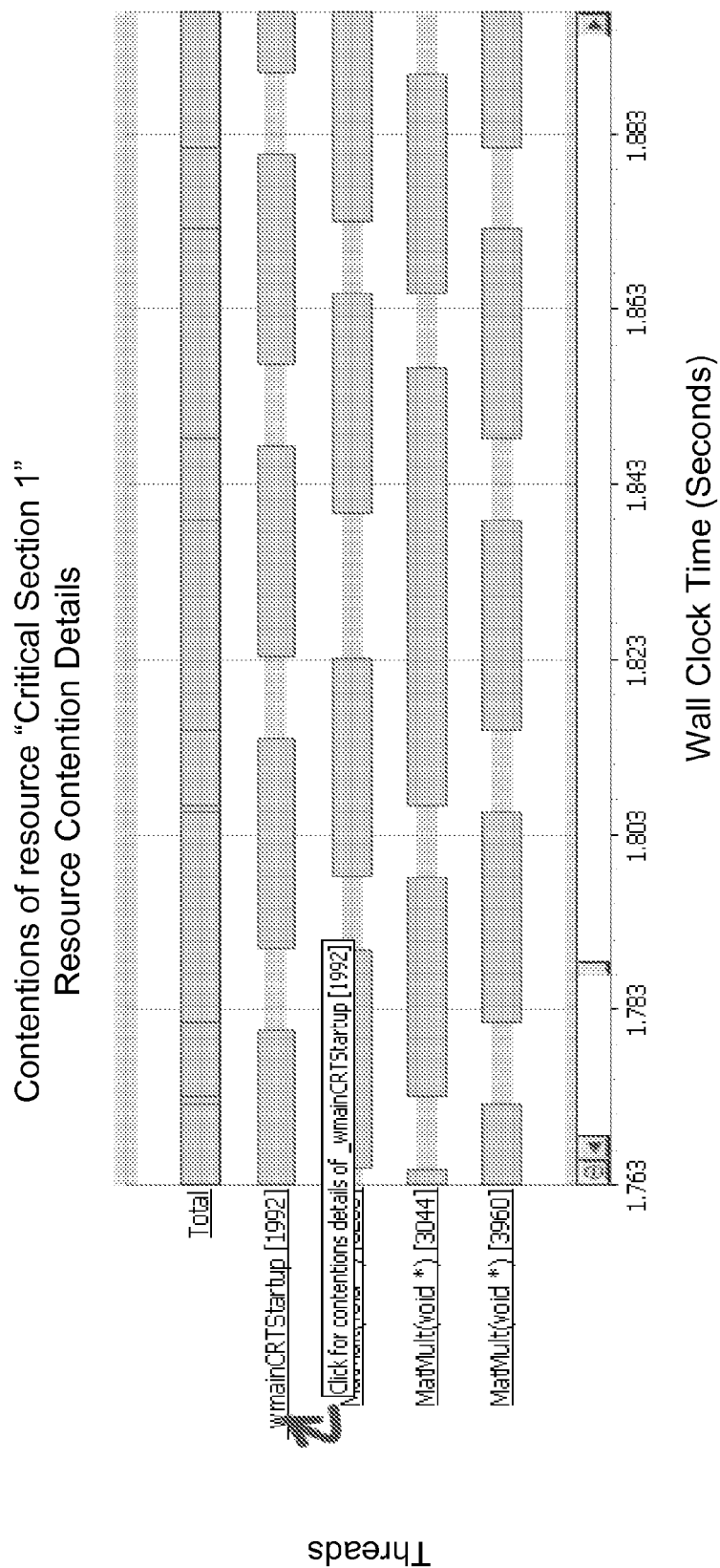
FIG. 7 is a copy of FIG. 5, further annotated to note a navigation link associated with a thread ID.

More specifically, FIG. 5 shows a Resource Contentions Details view 228 which presents lock contentions 204 of multiple threads 126 on a particular "Critical Section 1" resource 128. FIG. 6 shows a Thread Contention Details view 228 which presents lock contentions 204 of a particular thread 126 "MSN Runtime Event Log Queue" with thread ID 2540 on various resources 128 during the thread's lifetime. A label in this example Resource Contention Details is implemented as a hyperlink, as indicated in FIG. 7. Each horizontal line in FIG. 7 represents a thread, and selecting the label hyperlink switches the displayed view 228 to a Thread Contention Details view having the context of the selected thread. Views 228 resembling those shown in FIGS. 5 through 7, and other views 228, were implemented and presented in April 2009 as part of a Microsoft® Visual Studio® integrated development environment 136 (marks of Microsoft Corporation).

Views 228 discussed herein can assist analysis of contention in application programs. A complex software application 120 may well introduce multiple threads 126 and multiple synchronization objects/resources 128. The threads might use a number of objects at any given time, e.g., by acquiring one of them, then acquiring another and getting an access to critical data, and then releasing all objects. Detection of a resource's owner may be assisted by efficient pivoting between the thread-based and resource-based representations noted above, allowing a developer to switch from a resource-based view 228 to a thread-based view 228, back to a resource-based view 228, and so on, with thread/resource and other context automatically provided in each representation.

To allow this pivoting between perspectives, data is organized and presented to allow quick and effective switches between resource-based and thread-based contention views 228. In particular, in some embodiments a user can select a specific thread on a resource detailed view and select a specific resource on a thread detailed view. For example, in the implementations illustrated in FIGS. 5 and 6, labels of horizontal axes can be implemented as hyperlinks or other navigational links such that a click on a specific label switches the displayed data 220 between views, setting context for the user automatically. FIG. 7 is accordingly annotated to show the availability of a link from a resource-based view 228 through a thread label ("_wmainCRTStartup [1992]") to a thread-based view 228.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storageretrieval and/or transmission approaches, or an embodiment in a computer system may operate without communicating with other computer systems.

Processes

Figure 3:
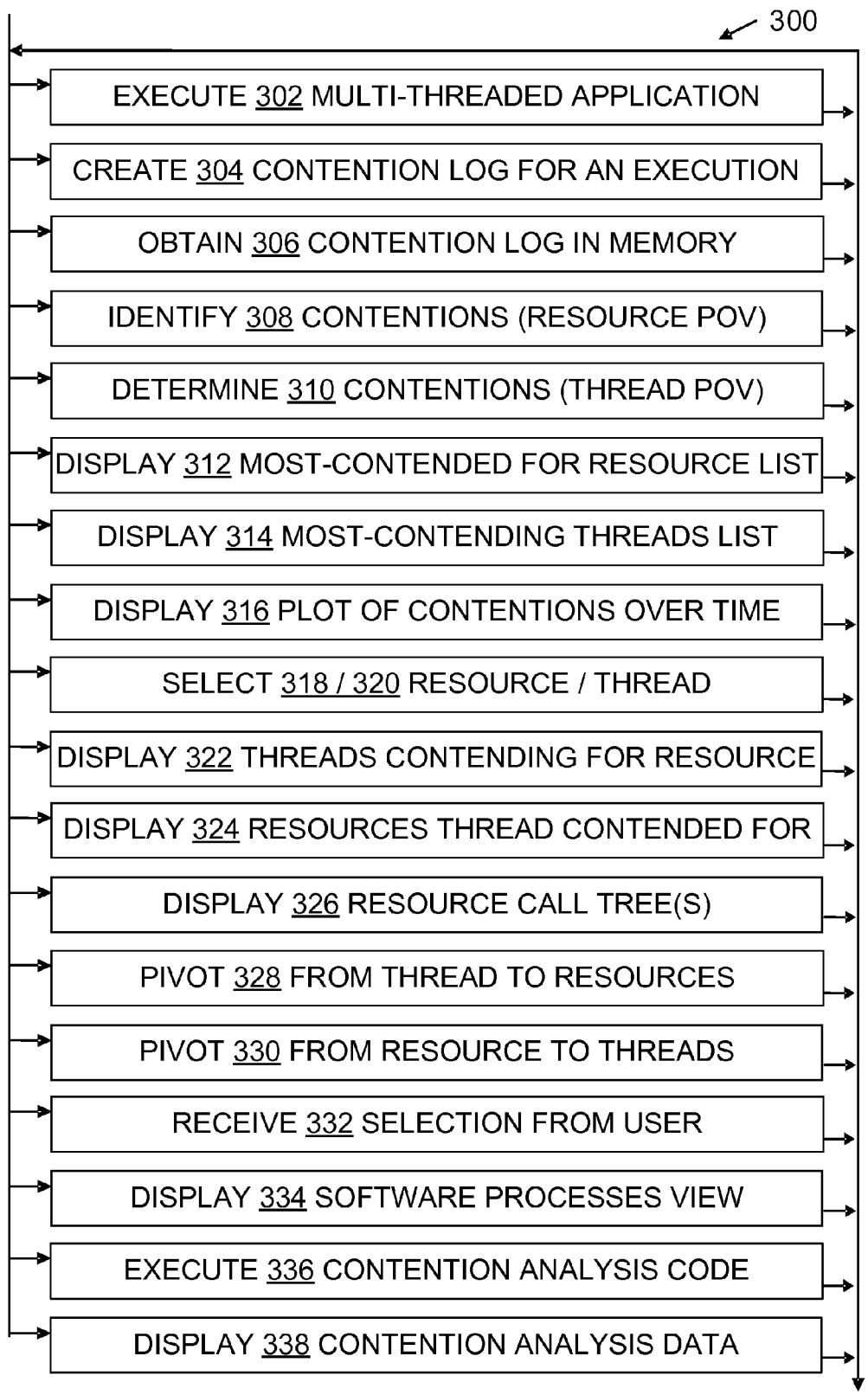
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by contention analysis code 218 under control of a script requiring little or no user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an application executing step 302, an embodiment executes a multi-threaded application 120. Step 302 may be accomplished using kernels 130, processors 110, media 112, and other familiar mechanisms, for example.

During a log creating step 304, an embodiment creates a contention log 202 for a given execution of a given application 120. The log 202 may be written to RAM, to disk, and/or to other media 112, locally and/or by way of a network 108. Step 304 may be accomplished using instrumentation, profiling, diagnostic, and other familiar mechanisms adapted to obtain and store the desired contention log entry data.

During a log obtaining step 306, an embodiment obtains a contention log 202 in a memory, such as in RAM or other memory readily accessible to analysis code 218 for processing. Step 306 may be accomplished using file systems, networks, and other familiar mechanisms adapted to locate and read the desired contention log.

During a resource-based contentions identifying step 308, an embodiment processes contention log entries to identify resource-based contentions 204, e.g., while calculating the total number of times a particular resource or specified set of resources was contended for. To identify 308 the number 224 of contentions for a particular resource R, for example, some embodiments of the analysis code 218 scan the log entries, and calculate the total number of entries which have a resource identity 214 value identifying resource R and which have a timestamp 206 that is unique within the set of such entries. To identify 308 the number 224 of contentions for a set of resources, up to and including all resources in the application 120, some embodiments perform the foregoing calculation to obtain a result for each resource and then add up those results to obtain the total for the specified set of resources.

During a thread-based contentions determining step 310, an embodiment processes contention log entries to identify thread-based contentions 204, e.g., while calculating the total number of times a particular thread or specified set of threads contended for any resource. To determine 310 the number 224 of contentions for a particular thread T, for example, some embodiments of the analysis code 218 scan the log entries, and calculate the total number of entries which have a thread identity 210 value identifying thread T and which have a timestamp 206 that is unique within the set of such entries. To determine 310 the number 224 of contentions for a set of threads, up to and including all threads in the application 120, some embodiments perform the foregoing calculation to obtain a result for each thread and then add up those results to obtain the total for the specified set of threads.

Figure 8:
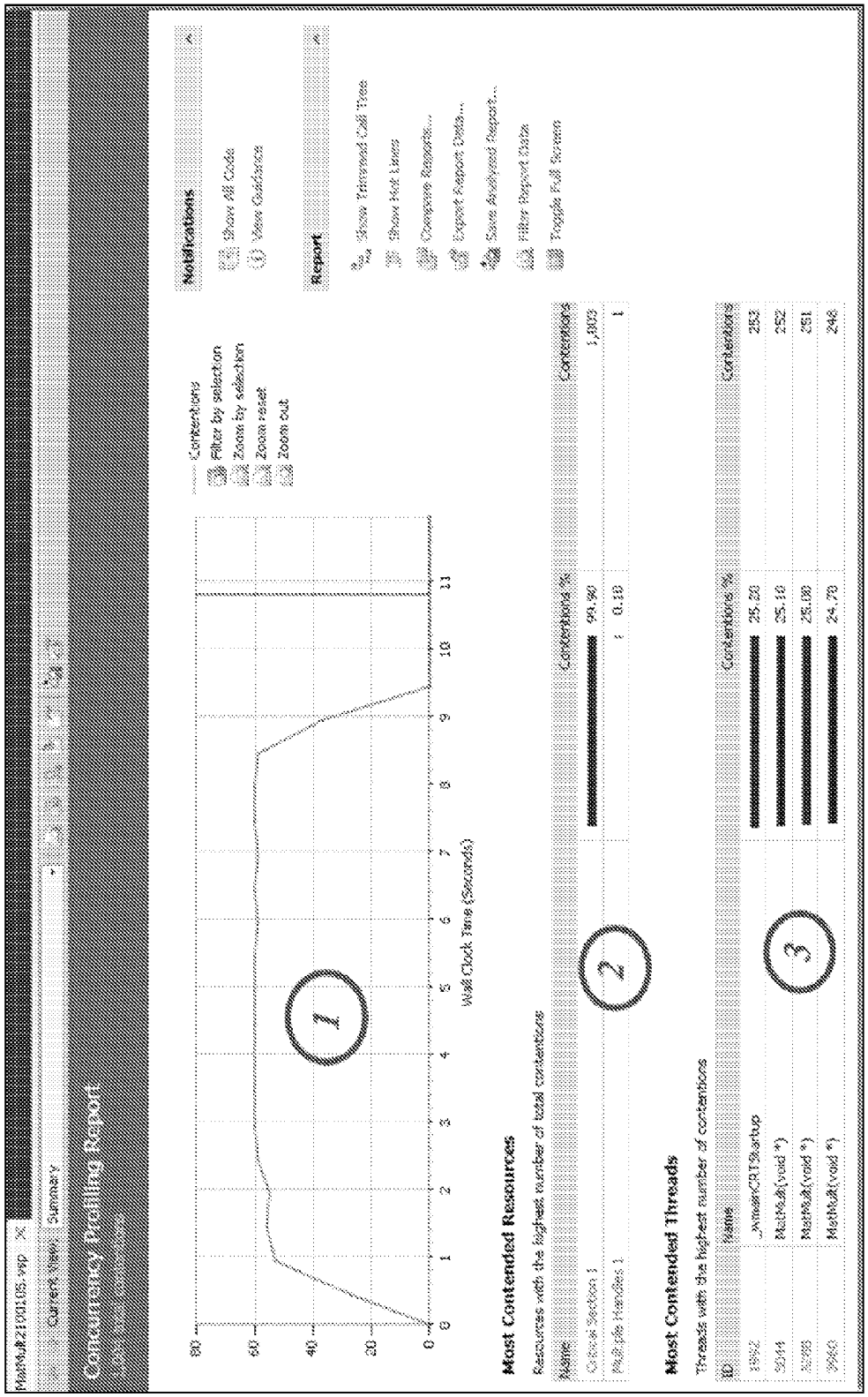
FIG. 8 is an annotated screen shot illustrating a contention summary view available in some embodiments.

During a most-contended resource list displaying step 312, an embodiment displays a list 222 of resources ranked according to their respective numbers of contentions. A total number of contentions for each resource in the application, or for each resource in a specified set of resources, or for each of several specified sets of resources, can be calculated as discussed in connection with step 308. Then the resources/resource sets can be ranked according to their respective totals, and displayed 312. For example, FIG. 8 illustrates a display 134 showing in an area designated generally by the circled number 2 a list 222 of Most Contended Resources ranked according to their respective numbers of contentions, in a summary view 228.

During a most-contending thread list displaying step 314, an embodiment displays a list 222 of threads ranked according to their respective numbers of contentions. A total number of contentions for each thread in the application, or for each thread in a specified set of threads, or for each of several specified sets of threads, can be calculated as discussed in connection with step 310. Then the threads/thread sets can be ranked according to their respective totals, and displayed 314. For example, FIG. 8 illustrates a display 134 showing in an area designated generally by the circled number 3 a list 222 of Most Contended Threads ranked according to their respective numbers of contentions, in a summary view 228.

During a plot displaying step 316, an embodiment displays a plot 230 of contention events over execution time or a portion thereof. Time may be measured in units such as wall clock time or processor cycles, for example. Time may be divided into intervals, with an interval total plotted for each interval reflecting all contentions whose timestamp places the contention within that interval. For example, FIG. 8 illustrates a display 134 showing in an area designated generally by the circled number 1 a plot 230 of contention events in a summary view 228.

During a resource selecting step 318, a user selects a particular resource 128, e.g., by clicking a resource label in a Graphical User Interface (GUI) or by indicating a resource identity 214 in a command line parameter in a script. As with some other steps discussed herein, resource selecting step 318 can be viewed not only from a user 104 perspective, but also from a system 102 perspective. Thus, the user's selecting action corresponds to a system action upon a resource label or other resource identifying data structure. The system can be said to select 318 a resource, e.g., by updating a selected_resource pointer or the like within contention analysis code 218.

Similarly, during a thread selecting step 320, a user selects a particular thread 126, e.g., by clicking a thread label in a GUI or by a command line thread identity 210 parameter in a script. Thread selecting step 320 can also be viewed from a system 102 perspective. Thus, the user's selecting action corresponds to a system action upon a thread label or other thread identifying data structure. The system can accordingly be said to select 320 a thread, e.g., by updating a selected_thread pointer or similar data structure in contention analysis code 218.

During a resource details displaying step 322, an embodiment displays labels and/or other identifiers for threads 126 which contended for a particular resource 128, either within a single contention 204 or at some time within a specified set (possibly all) of contentions during the execution of the application. For example, FIG. 5 shows such a list of threads in a resource details view.

During a thread details displaying step 324, an embodiment displays labels and/or other identifiers for resources 128 for which a thread 126 contended, either within a single contention 204 or at some time within a specified set (possibly all) of contentions during the execution of the application. For example, FIG. 6 shows such a list of resources in a thread details view.

During a resource call tree(s) displaying step 326, an embodiment displays one or more call trees 226 for a particular resource 128 or specified set of resources, showing e.g., the chain of method/function calls made that led to a contention for the resource(s) in question. For example, the pertinent log entries can be identified using the resource identity 214, and then thread call stacks 212 from those entries can be displayed.

During a thread-to-resource pivoting step 328, an embodiment (or a user operating an embodiment) causes a display 134 to change from a thread details view (e.g., FIG. 6) to a resource details view (e.g., FIG. 5). The respective views can be produced using the data in the log 202, as noted in connection with steps 322 and 324.

During a resource-to-thread pivoting step 330, an embodiment (or a user operating an embodiment) causes a display 134 to change from a resource details view (e.g., FIG. 5) to a thread details view (e.g., FIG. 6). The respective views can be produced using the data in the log 202, as noted in connection with steps 322 and 324.

In some situations, usage of synchronization objects assumes periodical acquisition attempts by various threads. A thread either succeeds or fails (blocking itself) in an acquisition attempt. Therefore, the following approach can be used for contention investigation in embodiments which support pivoting 328, 330:

1. Identify a thread T1 of interest.
2. Start viewing a thread based report for T1.
3. Find a resource R1 that causes T1 to be blocked most of the time.
4. Pivot to R1 based report that shows all threads that were blocked on this resource.
5. Find a thread T2 that was blocked on this resource.
6. Pivot back to a thread detailed view with the context set to T2.
7. Find a resource R2 that causes T2 to be blocked most of the time.
8. Pivot to an R2 based report.
9. Continue as desired.

This iterative approach facilitates identification of threads that are blocked on specific resources, and resources that cause blocking of specific threads. Such information may complete the picture of data collected for each separate contention, and lead to detection of the synchronization object owner in each case. For example, if an investigator sees a number of threads competing in acquisition of resource R, and at some specific time some number of those threads are blocked on R, then a remaining thread (which is not blocked) is the owner thread holding the lock. The foregoing investigative steps can be applied manually by a human user or programmatically by software.

During a selection receiving step 332, an embodiment receives a selection from a user, e.g., through a GUI or a command line parameter. For instance, the embodiment may receive resource selections and thread selections as noted in connection with steps 318 and 320. An embodiment may also receive 332 selections indicating a choice of views 228, a choice of time intervals for a plot 230, and other factors used by contention analysis code 218 as taught herein.

During a software processes displaying step 334, an embodiment displays a list 222 of one or more software processes 124, such as process(es) associated with specified thread(s) and/or specified resource(s). Familiar debugging, profiling, kernel, and/or other mechanisms can be used to identify such associations during execution and record them in a log, e.g., as part of the log management info 216.

During an analysis code executing step 336, an embodiment executes at least a portion of contention analysis code 218, processing contention log data and producing contention analysis data 220.

During an analysis data displaying step 338, an embodiment displays contention analysis data 220. As with other references herein to "displaying" or "displays" used as a verb, displaying step 338 may display by configuring a display 134 and/or may display by producing a printable or printed output.

The foregoing steps and their interrelationships are discussed in greater detail below, in connection with various embodiments.

Some embodiments provide a process for facilitating contention analysis. The process utilizes a device which has at least one logical processor in operable communication with at least one memory. The process includes executing 302 a multi-threaded application and creating 304 during execution of the application a contention log 202 for the application 120. After execution of the application ends, the process identifies 308 from the contention log for each of a plurality of resources 128 a total number 224 of resource point-of-view contentions 204 which occurred during execution of the application for the resource. Also after execution of the application ends, the process determines 310 from the contention log for each of a plurality of threads 126 a total number 224 of thread point-of-view contentions 204 encountered by the thread during execution of the application 120.

In some embodiments, the process obtains 306 in the device memory a contention log 202 containing at least the following information for each of a plurality of logged contentions 204: a timestamp 206 of the contention, a length 208 of the contention, a contending thread identity 210, a contending thread call stack 212, a contended-for resource identity 214.

In some embodiments, the process displays 312 on a display 134 a summary view 228 showing at least a list 222 of resources 128 that were most contended for and a list 222 of threads 126 that were most contending. FIG. 8 illustrates one of many possible summary views 228 containing such data 220. As also illustrated by FIG. 8, in some embodiments the process displays 316 on a display a plot 230 of the number of contentions per time interval during execution of the application.

In some embodiments, the process displays 322 on a display 134 a resource details view 228 showing a list 222 of threads which contended for a selected resource during execution of the application. FIG. 5 illustrates one of many possible views 228 containing such data 220.

In some embodiments, the process displays 324 on a display 134 a thread details view 228 showing a list 222 of resources which a selected thread contended for during execution of the application. FIG. 6 illustrates one of many possible views 228 containing such data 220.

In some embodiments, the process includes pivoting from a resource details view to a thread details view. For example, one embodiment includes pivoting 330 among steps such as: receiving 332 a resource selection 318 specifying a particular resource; then displaying 322 a resource details view showing a list of threads which contended for the particular resource during execution of the application; then receiving 332 a thread selection 320 specifying a particular thread from the list of threads that contended for the particular resource; and then displaying 324 a thread details view showing a list of resources which the particular thread contended for during execution of the application.

In some embodiments, the process includes pivoting in the other direction, that is, from a thread details view to a resource details view. For example, one embodiment includes pivoting 328 among steps such as: receiving 332 a thread selection 320 specifying a particular thread; then displaying 324 a list of resources for which the particular thread contended during execution of the application; then receiving 332 a resource selection 318 specifying a particular resource from the list of resources for which the particular thread contended; and then displaying 322 a list of threads which contended for the particular resource during execution of the application.

In some embodiments, the process includes displaying 326 a resource call tree view 228 showing contention call trees organized according to contended-for resource. That is, this view may show stacks 122 for threads that were blocked on a specific resource, for each of a plurality of resources. A category including the resource call tree view 228 is also referred to below in the Additional Examples portion as the "contention view".

Steps illustrated and/or otherwise disclosed herein may be combined in other ways as well. For example, some embodiments include a process for facilitating contention analysis, which includes obtaining 306 after an execution of a multi-threaded application a contention log 202 produced by that execution. The contention log contains at least the following information for each of a plurality of logged contentions: a contending thread identity, a contended-for resource identity. Other log implementations may contain additional data, as discussed herein. The process identifies 308 from the contention log for each of a plurality of resources a total number of resource point-of-view contentions which occurred during execution of the application for the resource. The process also determines 310 from the contention log for each of a plurality of threads a total number of thread point-of-view contentions encountered by the thread during execution of the application. Some embodiments display 312 a list of resources that were most contended for and/or display 314 a list of threads that were most contending. Some display 334 a software processes view 228 showing a list of software processes of the application, showing for each such software process a list of threads belonging to the software process, and showing for each such thread a number of contentions made by the thread during execution of the application. Some embodiments also include steps discussed elsewhere herein.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as a contention log 202, contention analysis code 218, and contention analysis data 220, in the form of data 118 and instructions 116, read from a removable medium 114 and/or another source such as a network connection, to form a configured medium. The configured medium 112 is capable of causing a system to perform process steps for transforming data through contention analysis processing as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. For example, many of the examples discuss contention concurrency profiling analysis tools and techniques in connection with Microsoft® Visual Studio® software, but it will be understood that embodiments are not limited to Visual Studio® software (marks of Microsoft Corporation). Although they are not necessarily required by law to be present here, these details are provided because they may help some readers by providing context and/or may illustrate a few of the many possible implementations of the technology discussed herein.

By way of introduction to the immediate discussion, it may be noted that as multiple core machines became part of daily life, more and more software developers create multi-threaded applications to take advantage of such hardware to achieve better performance. To take advantage of multiple threads, it may be logical to split the overall work into separate tasks, and execute those tasks in parallel.

Process threads, however, might need to communicate with each other to complete a task, and sometimes attempt to synchronize their behavior under a given algorithm or given data access regime. Synchronization may be done through usage of shared synchronization objects (which are an example of resources 128), where a thread acquiring the object ownership successfully is granted a shared or exclusive access to the sensitive code/data. When the access is no longer desired, the ownership is relinquished, and other threads may attempt to gain access to the resource. Depending on the type of synchronization, simultaneous or overlapping requests for ownership might allow multiple threads to proceed, accessing shared resources together, or might block some of the threads until the object is released from previous acquisition. Examples of resource 128 usage include critical sections in C/C++ with EnterCriticalSection( ) and LeaveCriticalSection( ) access routines, WaitForSingleObject( ) in C/C++, lock C# statement, and usage of C# Monitor class, to name just a few.

The choice of synchronization mechanism may call for care, as synchronization between the threads might kill the entire application performance boost that one tries to gain through multiple threads creation. Thus, it can be helpful to be able to detect situations where threads are blocked in lock contentions and make no progress. The Microsoft® Visual Studio® 2010 IDE 136 and other environments may be seen as suitable environments for lock contention profiling to assist in concurrency contention detection.

As an example, consider a matrix multiplication application, which is one of many applications 120 of potential interest for contention analysis. This example application uses multiple threads to multiply two matrices, where each thread gets a portion of the job and runs the following code:

```
for (i = myid*PerProcessorChunk; i <
(myid+1)*PerProcessorChunk; i++)
{
   EnterCriticalSection(&mmlock);
   for (j=0; j<SIZE; j++)
   {
      for (k=0; k<SIZE; k++)
      {
         C[i][j] += A[i][k]*B[k][j];
      }
   }
   LeaveCriticalSection(&mmlock);
}
```

Each thread has its own ID (myid), and is responsible for calculation of number of rows in resulting matrix C, using matrixes A and B as an input. Code inspection shows, however, that no write sharing happens, and threads are writing into different rows of C. Despite this, the result writing is guarded with a critical section, providing an opportunity here to explore contention analysis approaches and to find the redundant synchronization.

Profiling Data Collection

In some situations, one might attach a profiler tool to an application that is up and running already. Alternately, given a Visual Studio® project with the above code, one can start contention profiling by launching the Performance Wizard. In the 2009 implementation noted, choose "Analyze", and then "Launch Performance Wizard". On the next step, choose "Concurrency" and "Collect resource contention data". Then choose the matrix multiplication project, and launch profiling after the Performance Wizard exits. The application starts running under profiler, and when it finishes, one gets a result file (named <project_name>.vsp in a Visual Studio® convention) in a Performance Explorer window.

Profiling Data Analysis

In this profiling mode each sample collection is triggered by lock contention, and only by lock contention; other implementations may use different triggers. In this implementation, if an application doesn't have any contentions, then no data is collected, and if data is collected, then the application is not lock contention free, so any module/function/source line that is shown has participated in at least one contention.

In this implementation, each collected data sample is attributed with the following information: timestamp of the contention, length of the contention, a contended thread identity, a contended thread call stack, a synchronization object (resource) identity. This information shows who (thread), where (resource, call stack), when (timestamp) and for how long (length) progress was blocked trying to acquire a lock, enter a critical section, wait for a single object, etc.

Data Views

In this implementation, a variety of Visual Studio® views are available to help inspect the collected data. Some views give a picture of application lifetime in whole, while some are focused on specific contention(s). Other implementations may use additional and/or different views, and/or may group data differently into views, and/or may refer to views by different names. In this implementation, available views 228 include those discussed, for example, in the following paragraphs.

In a Summary view, summary information is presented to serve as a starting point for an investigation. This is the first view seen, and is opened automatically after a profiling session is over (execution has ended) and a result file (a log 202) is ready.

A Call Tree view shows an aggregated call tree of all contention stacks. One can see there which stacks were responsible for the contention(s).

A Modules view shows a list 222 of modules that contain functions resulting in a contention. Each module has a list of relevant functions and the number 224 of detected contentions.

A Caller/Callee view includes a three-panel view which presents a specified function F, all functions that call F, and functions that are called by F, filtered to show only calls which resulted in contentions.

A Functions (Routines) view shows a list of all detected functions (routines) that were on any contention stack, with their associated data.

A Lines view shows function (routine) lines in the source code.

A Resource Details view provides a detailed view of a specific resource 128, showing in particular some or all (user selectable) threads that were blocked on the resource during the application lifetime. One of the possible versions of this view is illustrated in FIG. 5.

A Thread Details view provides a detailed view of a specific thread 126, showing all resources the thread was blocked on. One of the possible versions of this view is illustrated in FIG. 6.

A Contention view is similar to a call tree view, but call trees are separated per contention resource. In other words, this view presents a set of call trees 226, each containing stacks 122 that were blocked on a specific resource.

A Marks view shows a list of automatically and manually recorded marks, where each mark is associated with its timestamp and with values of windows counters.

A Processes view shows a list of inspected processes, where each process has a list of its threads, and each thread is attributed with the number of contentions it experienced, and a summarized length of blocked time.

A Function (Routine) Details view provides a detailed view of a specific function, including functions it calls and collected data.

An IPs view shows a list of instruction pointers where contention happened. This list may be a list of functions like EnterCriticalSection, or WaitForSingleObject, etc., where contention occurs.

A given embodiment need not include all views, and a given contention investigation process need not utilize all views. Some of the views are discussed further below, including a discussion of some possible convenient transitions between views during investigation of contentions.

Summary View

In some embodiments, when a user opens the log file (or when it is opened automatically by analysis code 218 after contention data is collected), a Summary View is displayed first. FIG. 8 shows one of many possible summary views 228.

In the FIG. 8 example, three main areas provide data 220 that may facilitate contention analysis, e.g., for use as brief diagnostics.

An area indicated generally by the circled number 1 includes a Contentions chart, wherein the number of contentions per second is plotted for the lifetime of the application execution. In some embodiments, one can use this chart to select a time interval and then zoom into the selected interval. One may also filter results, by having code 218 reanalyze data to exclude values outside the selected interval.

An area indicated generally by the circled number 2 includes a Most Contended Resources display, showing which resources caused most of the detected contentions, for one or more specified threads.

An area indicated generally by the circled number 3 includes a Most Contended Threads display, showing which threads have the highest number of contentions. In this implementation, the displayed table uses number of contentions as a criterion, not length of the contentions. One might have a thread that is blocked in a single contention for a long time yet is not displayed in this Summary View. One may also have a thread that experienced many very short contentions, each of them blocking the thread for a very short time, but this thread will be presented here. For example, FIG. 8 indicates that Critical Section 1 is responsible for essentially all (99.90%) contentions in the application execution on which the Figure is based.

Resource Details View

In this implementation, displayed resource names and thread IDs are tied to hyperlinks. Clicking on Critical Section 1, for example, transfers navigation into a Resource Details view where the context is set to the specific resource, namely, Critical Section 1. One such view includes a time-based chart like that shown in FIG. 5, where each horizontal line belongs to a thread. The lines are named by the thread root function unless one has named the managed thread in the application code, in which case the name in the application code will be used on the chart lines. A block on the line represents a contention of the thread on the resource; the block length is the contention length. Blocks from different lines might overlap in time, indicating that number of threads was blocked on the resource at the same time. The "Total" line doesn't belong to any specific thread, but rather reflects all contentions of all threads on this resource (it is implemented as a projection of contention blocks to the line). In the FIG. 5 example, Critical Section 1 was quite busy, in that it apparently has no empty slots on its Total line.

In some embodiments, the Resource Details view also includes a contention call stack region, which is empty until a user selects a contention of interest. A user may select some portion of the time-based chart discussed in the preceding paragraph, and then click on a contention block, causing the corresponding stack to show up. In one implementation, a user can hover the cursor over a contention block on the time-based chart without clicking on it, and a pop-up window will display the stack and the contention length.

Function Details View

Assume one sees a particular function (MatMult, in this example) on the contention call stack. One can then determine which line of code caused a contention. Double clicking on the function name in the call stack panel navigates to the Function Details view. This view provides graphical presentation of functions that called MatMult( ), and functions that were called inside of MatMult( ). For example, the view may show that EnterCriticalSection(&mmlock) is responsible for threads being blocked. One can then reconsider uses of synchronization in MatMult( ), and make changes, such as removing or commenting out usage of mmlock. Similar investigations may be made in other applications.

Figure 4:
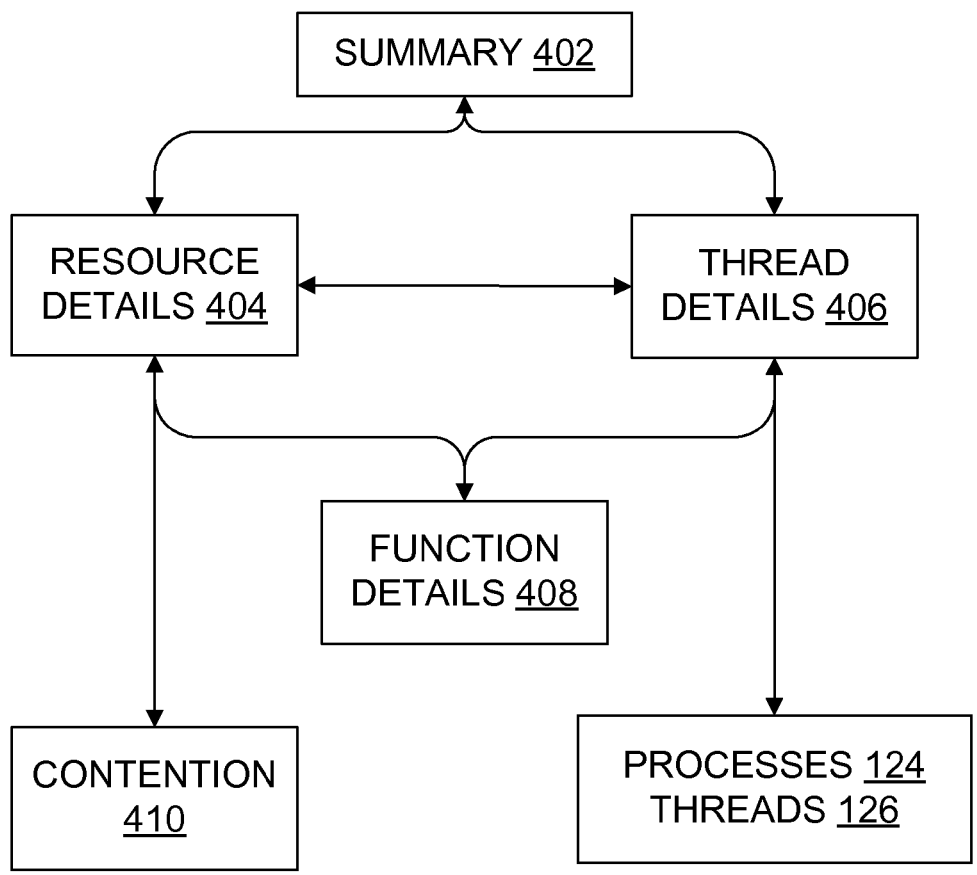
FIG. 4 is a diagram illustrating view categories available in some embodiments and some transition paths between those categories during contention analysis.

With reference to FIG. 4, the path taken in this example investigation thus far started at a summary 402 (Summary View, click resource name), then went to some resource details 404 (Resource Details View, zoom, click contention, click function name), then went to some function details 408 (Function Details View) and some source code. This investigation path is merely one of several possible ways to consider contention analysis data 220.

Thread Details View

As another example, suppose one clicks on thread ID on the Summary View. This navigates to the Thread Details View, which resembles the Resource Details View but has a different meaning. The example Thread Details View shown in FIG. 6 is populated with the context of the selected thread. In the time-based chart each horizontal line represents a resource that the thread contended for during its lifetime. One does not see contention blocks overlapping in time, as overlap would mean the same thread was blocked on more than one resource simultaneously. In this implementation WaitForMultipleObjects( ) is handled separately and is represented with a single chart line for the set of objects.

In this Thread Details View one can zoom the chart in and out, select a specific contention 204, and get that contention's length in milliseconds and a calling stack. Clicking on the function name in a contention call stack panel will navigate to a function details view Resource and Thread Details Views Switch In this implementation, labels of the FIG. 6 chart axis are also hyperlinks, which allows switching (pivoting 328, 330) between detailed views of resource(s) and thread(s), with the analysis code 218 automatically setting context for each displayed view. Pivoting supports an iterative approach, where for example, one can inspect resource R1 that blocked many threads, go from there to detailed view of thread T1, find out that it was blocked not only on R1 but sometimes also on resource R2, dive into details of R2, observe all threads that were blocked by R2, click on label of thread T2 that draws attention, check all resources that blocked T2, and so on.

Contention profiling data will not necessarily provide an explicit answer to the question of who is holding a lock at any given time. But given usage of a synchronization object between threads, and knowledge of an application's behavior, one may identify a possible lock owner (a thread that succeeded in synchronization lock acquisition) through pivoting between resource details and thread details.

Contention View

As noted, this implementation includes a chart Total line which displays a projection of all contention blocks. The Total label is a hyperlink also, but clicking a Total line label of a Resource Detailed View navigates to a Contention view, which shows a collection of contention call trees per resource. The hot path of the appropriate resource call tree will be activated (pre-opened). The view shows contentions and blocking time statistics for each resource and for each node (function) in the resource call tree. From Contention view one can go back to a Resource Details View of any resource, using a context menu: point to a resource, right-click the mouse and select Show Contention Resource Details. Other actions could also be applied to a selected item using a context menu.

Processes/Threads View

In this example, clicking Total label of Thread Detailed View leads to the Processes view, where an appropriate thread is selected. In this view one can see when the thread started (relative to the application start time), when it was terminated, how long it was running, how many contentions it experienced, and how long it was blocked totally on all contentions (in milliseconds and/or in percentage of lifetime, for example).

It is possible in this implementation to come back to the Thread Detailed View of any thread through a context menu: select a thread of interest, right-click the mouse, and use Show Thread Contention Details item. So another possible investigation flow could be going to Processes View directly from Summary View when the file is open, sorting threads by clicking on the title of one of available columns (for example, sort threads by number of contentions), select one of threads and switch to its contention details chart through a context menu. That is, a possible investigation path is open a log 202 file, leading to a summary 402, select Processes View from available views, sort threads, select thread of interest, switch to Thread Contention Details (context menu), and inspect thread contentions.

FIG. 4 depicts some but not all categories of data views. Although FIG. 4 shows some ways to navigate through views during an investigation, other paths are also possible. In some embodiments, a user can select any desired view through a drop-down combo box that enumerates all views. In some, one can move from one view to another using context menu items.

FIG. 4 illustrates particular paths, without excluding other paths. Some investigative paths of interest may include one or more of the following transition(s): move from Summary View to Resource Details View (chart) by clicking a resource name in the Most Contended Resources table; move from Summary View to Thread Details View (chart) by clicking a thread ID in the Most Contended Threads table; pivot from Resource Details View to Thread Details View by clicking on a chart label, representing the thread; pivot from Thread Details View to Resource Details View by clicking on a chart label, representing the resource; move from Resource Details View to Function Details View by double clicking on a function name in Contention Call Stack panel; move from Thread Details View to Function Details View by double clicking on a function name in Contention Call Stack panel; move from Resource Details View to Contention View by clicking on a Total label of the chart; move from Contention view to Resource Details View through a context menu (right-click) of a resource; move from Thread Details View to Processes/Threads View by clicking on a Total label of the chart; move from Processes/Threads View to Thread Details View through a context menu of a thread.

For example, one investigative path starts in a summary 402 and then transitions to resource details 404 then to thread details 406 then to resource details 404. One investigative path starts in summary 402 and then transitions to thread details 406 then to resource details 404 then to thread details 406. One investigative path starts in summary 402 and then uses a drop-down combo box to navigate to contentions view 410, where it sorts all resources, selects one of them, and then pivots between resource details 404 and thread details 406. One investigative path starts in summary 402 and then uses a drop-down combo box navigation to view processes 124 and their threads 126, sorts all threads, selects one of them, and then pivots between thread details 406 and resource details 404. Each of these paths (and others) may also navigate to function details 408, to view function source code at which contentions occur, for example.

Alternative Ways of Data Collection

In this implementation, if one creates a performance session for either Sampling or Instrumentation profiling, one can convert it later to Concurrency mode. For instance, one can to use a profiling mode drop-down combo box of the Performance Explorer. Another way is to go through a Properties setting of a session. Point to the session in Performance Explorer, use a mouse right-click to get a context menu, and then select Properties. A General tab of Property Pages gives control over profiling session mode and other profiling parameters. Once profiling mode is set for Concurrency (or Sampling, for that matter), one may either launch the application or attach to the application if it is up and running already, using Performance Explorer. Although usage of this Visual Studio® user interface automates some steps used to collect profiling data, it is also possible to collect the data using profiler command line tools, e.g., for automated runs, scripts, and the like.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for facilitating contention analysis by pivoting between resource details and thread details, the process utilizing a device which has at least one logical processor in operable communication with at least one memory, the process also utilizing a contention log created during execution of a multi-threaded application, the process comprising the following steps after execution of the application ends:
   identifying from the contention log for each of a plurality of resources a total number of resource point-of-view contentions which occurred during execution of the application for the resource;
   determining from the contention log for each of a plurality of threads a total number of thread point-of-view contentions encountered by the thread during execution of the application;
   and pivoting from resource details to thread details by:
      receiving a resource selection from a user specifying a particular resource; then
      displaying on a display a resource details view showing a list of threads which contended-for the particular resource during execution of the application; then
      receiving a thread selection from the user specifying a particular thread from the list of threads that contended for the particular resource; and then
      displaying on the display a thread details view showing a list of resources which the particular thread contended for during execution of the application.

2. The process of claim 1, further comprising obtaining the contention log in the device memory, the obtained contention log containing at least the following information for each of a plurality of logged contentions: a timestamp of the contention, a length of the contention, a contending thread identity, a contending thread call stack, and a contended for resource identity.

3. The process of claim 1, further comprising displaying on a display a summary view showing at least a list of resources that were most contended for and a list of threads that were most contending.

4. The process of claim 1, further comprising displaying on a display a plot of the number of contentions per time interval during execution of the application.

5. The process of claim 1, further comprising displaying on a display a resource call tree view showing contention call trees organized according to contended-for resource, namely, showing stacks for threads that were blocked on a specific resource, for each of a plurality of resources.

6. The process of claim 1, wherein receiving a resource selection from a user specifying a particular resource comprises receiving a click on a navigational link.

7. The process of claim 1, wherein the process comprises automatically setting context to the selected resource in a software development tool when the user specifies the resource selection.

8. The process of claim 1, wherein displaying on the display a thread details view showing a list of resources which the particular thread contended for during execution of the application comprises showing a time-based chart containing multiple lines, each of which lines represents a resource that the thread contended for during the thread's lifetime.

9. A computer-readable storage medium configured with data and with instructions that when executed by at least one processor causes the at least one processor to perform a process for facilitating contention analysis by pivoting between resource details and thread details, the process comprising the steps of:
   obtaining after an execution of a multi-threaded application a contention log produced by that execution, the contention log containing at least the following information for each of a plurality of logged contentions: a contending thread identity, a contended-for resource identity;
   identifying from the contention log for each of a plurality of resources a number of resource point-of-view contentions which occurred during execution of the application for the resource;
   determining from the contention log for each of a plurality of threads a number of thread point-of-view contentions encountered by the thread during execution of the application; and
   pivoting by:
      receiving a thread selection specifying a particular thread; then
      displaying on a display a list of resources for which the particular thread contended during execution of the application; then
      receiving a resource selection specifying a particular resource from the list of resources for which the particular thread contended; and then
      displaying on the display a list of threads which contended for the particular resource during execution of the application.

10. The configured medium of claim 9, wherein the process further comprises displaying on a display at least a list of resources that were most contended for and a list of threads that were most contending.

11. The configured medium of claim 9, wherein the process further comprises displaying on a display a resource call tree view showing contention call trees organized according to contended-for resource, namely, showing stacks for threads that were blocked on a specific resource, for each of a plurality of resources.

12. The configured medium of claim 9, wherein the process further comprises displaying on a display a software processes view showing a list of software processes of the application, showing for each such software process a list of threads belonging to the software process, and showing for each such thread a number of contentions made by the thread during execution of the application.

13. The configured medium of claim 9, wherein receiving a thread selection from a user specifying a particular thread comprises receiving a click on a navigational link.

14. The configured medium of claim 9, wherein the process comprises automatically setting a context to the selected thread when the user specifies the thread selection.

15. The configured medium of claim 9, wherein displaying on the display a list of threads which contended for the particular resource during execution of the application comprises displaying thread labels which serve as hyperlinks.

16. A computer system for facilitating contention analysis by pivoting between resource details and thread details, the computer system comprising:
   a logical processor;
   a memory in operable communication with the logical processor;
   a loaded threads data structure residing in the memory and identifying all currently loaded threads in the system, the loaded threads data structure indicating that a particular application program has no currently loaded threads;

a contention log residing in the memory and having at least the following information for each of a plurality of logged contentions of a previous execution of the particular application program: a timestamp of the contention, a contending thread identity, a contending thread call stack, and a contended-for resource identity; and contention analysis code which upon execution will configure a display with contention analysis data that corresponds to the contention log and will pivot context displayed between resource details and thread details in response to user selection of a particular contending thread identity in a resource details view configuring the display and also in response to user selection of a particular contended-for resource identity in a thread details view.

17. The system of claim 16, wherein the system comprises a display configured by contention analysis data which includes for each of a plurality of resources a total number of resource point-of-view contentions for the resource, and also includes for each of a plurality of threads a total number of thread point-of-view contentions encountered by the thread.

18. The system of claim 16, wherein the system comprises a display configured by contention analysis data which includes at least one of the following:
    a list of threads which contended for a particular resource during execution of the particular application program;
    a list of resources which a particular thread contended for during execution of the particular application program.

19. The system of claim 16, wherein the system comprises a display configured by contention analysis data which includes contention call trees organized according to contended-for resource, namely, showing stacks for threads that were blocked on a specific resource, for each of a plurality of resources.

20. The system of claim 16, wherein the system comprises a display configured by contention analysis data which includes a list of software processes of the particular application program, showing for each such software process a list of threads belonging to the software process, and showing for each such thread a number of contentions made by the thread during execution of the particular application program.

* * * * *